(12) United States Patent
Abdo et al.

(10) Patent No.: US 7,509,406 B2
(45) Date of Patent: Mar. 24, 2009

(54) MANAGING TERMINAL SERVICES ACCOUNTS AND SESSIONS FOR ONLINE UTILIZATION OF A HOSTED APPLICATION

(75) Inventors: Ralph Abdo, Sammamish, WA (US);
Jeffrey Allen Case, Renton, WA (US);
Chi-Ming Lin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 10/955,688

(22) Filed: Sep. 30, 2004

(65) Prior Publication Data
US 2006/0085546 A1    Apr. 20, 2006

(51) Int. Cl.
*G06F 15/173* (2006.01)
*G06F 15/16* (2006.01)

(52) U.S. Cl. .................. 709/223; 709/227; 709/224
(58) Field of Classification Search .................. 709/227, 709/223, 224
See application file for complete search history.

(56) References Cited

U.S. PATENT DOCUMENTS 5,845,065 A    12/1998  Conte et al.
6,499,035 B1   12/2002  Sobeski
2003/0037294 A1 2/2003  Robsman et al.
2006/0031529 A1* 2/2006 Keith, Jr. .................. 709/227

FOREIGN PATENT DOCUMENTS

EP    0778512 A2    6/1997
EP    0778512 A3   12/2000
EP    1411429 A2    4/2004

* cited by examiner

*Primary Examiner*—Tonia L Dollinger
*Assistant Examiner*—Anish Sikri
(74) *Attorney, Agent, or Firm*—Merchant & Gould

(57) ABSTRACT

Systems, computer-program-products, and methods for managing terminal services (TS) accounts and sessions for online utilization of hosted applications are provided. A system is operative to monitor a supply of available TS accounts and create TS accounts in response to detecting that the supply of available TS accounts is below a minimum number. When a request to access a TS session is detected, the system provisions a TS account for the user to immediately access the TS session without entering credentials. The provisioned TS account provides access and is associated with a unique profile. The system is also operative to receive the request to access the hosted application and decrypt credentials generated for the user. A method involves reading a username assigned to a user requesting access, locating the TS account associated with the username, identifying the language associated with the TS account, and launching the hosted application in that language.

41 Claims, 10 Drawing Sheets

MANAGING TERMINAL SERVICES ACCOUNTS AND SESSIONS FOR ONLINE UTILIZATION OF A HOSTED APPLICATION

TECHNICAL FIELD

The present invention relates generally to managing terminal services sessions and accounts for one or more terminal services. More particularly, the present invention relates to managing online evaluations or trials of a hosted application without a user signing up for an account and/or without downloading the hosted application to the computer of a user.

BACKGROUND

Providing opportunities for potential customers to evaluate or try software applications may lead to increased sales volume for software manufacturers. However, the effort required to acquire and install trial versions of software products may deter potential buyers from investing the time or system resources. In addition, users are often hesitant to install unfamiliar software due to the potential risks to their system. This is especially the case for version one products which potential buyers may not know much about and are likely to be unsure about the value they can expect. One option for providing trial versions of an application is to mail out trial CDs. This option typically is costly, does not scale, and leaves the software vulnerable to piracy. Another disadvantage of CDs is that they do not provide a means to track the percentage of target users that receive and actually install the trial product.

Terminal services (TS) work in conjunction with clients to provide a network-based client/server computing environment in which much of the processing load is shifted from the client to the server. The client and the terminal server operate in what is called a thin-client computing environment. TS is a component of a server's operating system that allows for remote access to the server. Servers in this environment must manage TS sessions and applications for multiple users concurrently. However, previous TS platforms require the user to provide entries to signup for an account or self authenticate and download a trial version of the software.

Without receiving signup inputs from each user to establish a private profile per user, previous TS platforms would require multiple users to share the same profile. Consequently, multiple users using the same desktop environment and/or the same profile folder could start interacting with each other's documents and start sending each other questionable content. There are other security risks, such as viruses, associated with multiple users using the same profile. Previous TS platforms also do not offer the ability to have custom-coded metrics logged for analysis.

Another shortcoming of previous TS platforms is that they don't provide the capability to pass custom data into TS sessions from web pages, nor do they provide locked down sessions. Locked down sessions prevent users from impacting the system on which the hosted application is running. With TS, an account has to be created and then given to a user. The user then has to type credentials in, click connect, and point to the right server. Previous TS platforms can be coded such that the TS front pages point to a given server, and an account can be hard coded. However, the problem remains that all users that hit the page will be using the same account and the same profile.

It is with respect to these considerations and others that the present invention has been made.

SUMMARY

Embodiments of the present invention provide methods, systems, and computer-readable-mediums for managing terminal services (TS) accounts and sessions for online utilization or evaluation of hosted applications. The invention relates to an account management system (AMS) that automatically pre-creates and provisions TS-enabled Active Directory accounts. The system has an account monitoring service that monitors for the number of accounts that are available for any given language. When the account monitoring service detects that the environment is running low on available accounts for any given language, the AMS automatically creates and configures a number of accounts for the appropriate language.

Second, embodiments of the present invention provide an online hosted application service that can block functionality of hosted applications, track and save session metrics, limit TS session length, and provide custom messages at warning times. The online-hosted application service also updates a TS accounts database to flag an account as being ready for purging. Accounts are disabled shortly after a user logs in. Thus, a user is prevented from logging back in with an account after their session has ended but before the account is purged. This functionality is provided by a TS application that is forced to run within every TS session. This TS controller allows for fine control of locked down TS session elements during hosted evaluation TS sessions.

One embodiment is a method for managing TS accounts for online utilization of a hosted application. The method involves monitoring a supply of available TS accounts, a demand for TS accounts, and/or a status of each TS account. More TS accounts are created in response to detecting that the supply of available TS accounts is below a minimum number of TS accounts having an available status. The minimum number of TS accounts having an available status is referred to as a buffer level. Whenever the number of available accounts diminishes below the buffer level for a given language, a preconfigured number of accounts for that language are created in bulk. Thus, the availability of TS accounts is ensured for multiple users utilizing the hosted application via online TS sessions.

The method also involves provisioning a TS account for use in accessing a TS session where each provisioned TS account is associated with a unique profile generated on behalf of a user. The TS session provides online use of the hosted application. The method may also involve de-provisioning the TS account from use when the TS session is closed.

Another embodiment is a system for managing TS accounts for online utilization of a hosted application. The system includes a first computer operative to monitor a supply of available TS accounts, a demand for TS accounts, and/or a status of each TS account. The first computer is also operative to create TS accounts in response to detecting that the supply of available TS accounts is below a buffer level, which is a minimum number of TS accounts having an available status. The supply of available TS accounts is replenished whenever the supply of available TS accounts is below the buffer level. Still further, when a request from a user to access a TS session in order to use the hosted application is detected, the first computer is operative to provision a TS account for the user to immediately access the TS session without the user entering credentials or any prolonged authentication. The TS session provides online use of the hosted application. The provisioned TS account provides access to a TS session and is associated with a unique profile.

Additionally, the system includes a second computer operative to receive the request to access the hosted application via a web page and decrypt credentials sent to an IP address on behalf of the user. The second computer then renders the credentials to the user via the web page. The TS accounts are provisioned to access TS sessions that provide access to the hosted application without a user entering credentials. The system may also include a third computer operative to receive and store the unique profile of a user associated with the TS account provisioned in response to user's request for access.

Still another embodiment is a method for managing TS sessions and TS accounts for online evaluation of a hosted application. The method involves reading a username assigned to a user requesting access to a TS session in order to evaluate the hosted application. The method further involves locating the TS account in use that is associated with the username assigned and identifying the language associated with the TS account located. The language comprises the language in which the user requested access and in which the hosted application will be rendered to the user. The method then involves launching the hosted application in the language associated with TS account located.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and other features and advantages, which characterize the present invention, will be apparent from a reading of the following detailed description and a review of the associated drawings. It is to be understood that both the foregoing general description and the following detail description are illustrative and explanatory only and are not restrictive of the invention as claimed.

DETAILED DESCRIPTION

Figure 1:
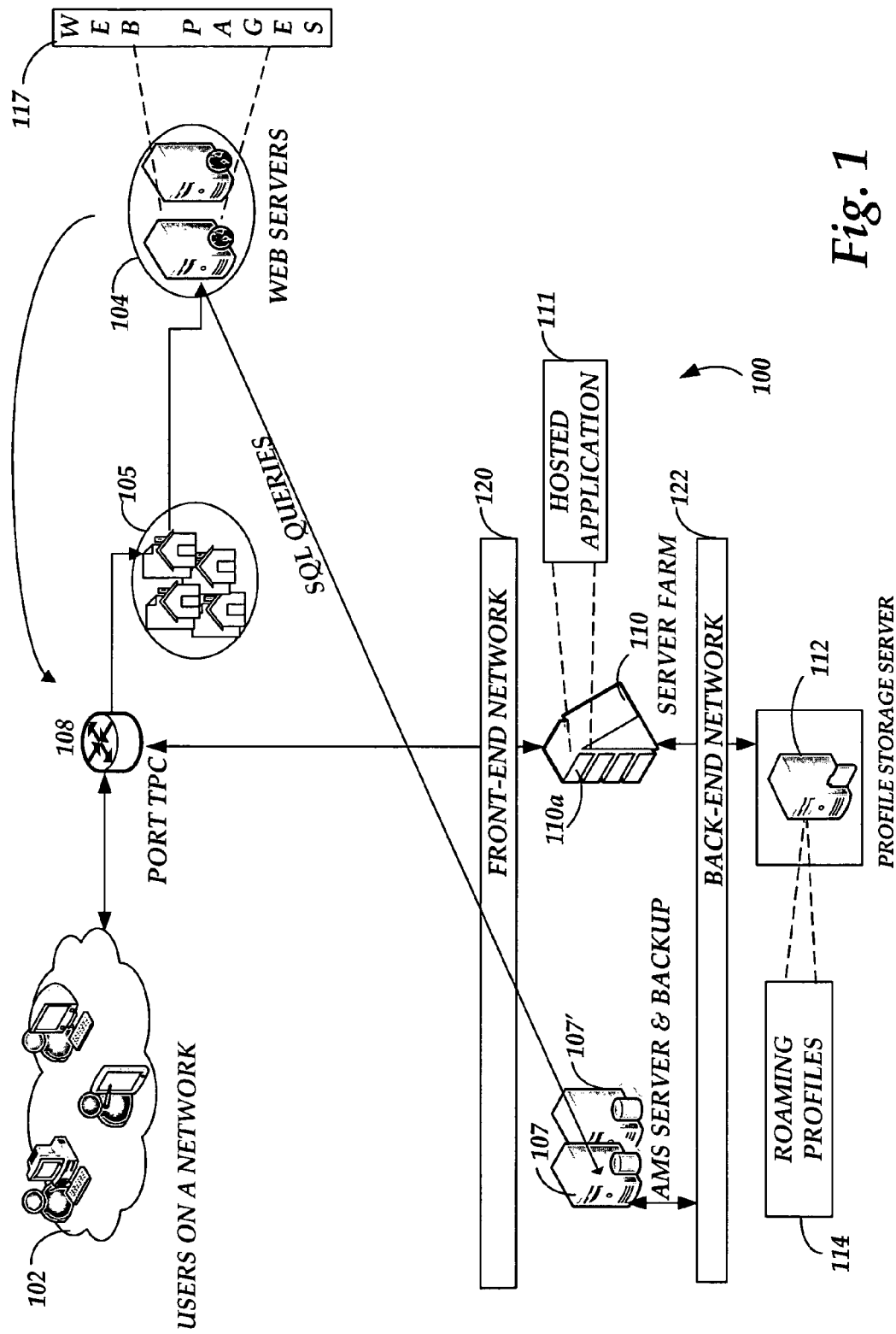
FIG. 1 is a high level diagram showing interaction between an account management system (AMS) server and a terminal services (TS) environment according to an illustrative embodiment of the present invention.

As described briefly above, embodiments of the present invention are directed to systems, methods, and computer-readable-mediums for managing TS accounts and sessions for online utilization and/or evaluation of hosted applications. In the following detailed description, references are made to the accompanying drawings that form a part hereof, and in which are shown by way of illustrations, specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Referring now to the drawings, in which like numerals represent like elements through the several figures, aspects of the present invention and the illustrative operating environment will be described. FIGS. 1-4 and the following discussion are intended to provide a brief, general description of a suitable computing environment in which the embodiments of the invention may be implemented. While the invention will be described in the general context of program modules that execute to manage TS accounts and sessions for online utilization and/or evaluation of hosted applications, those skilled in the art will recognize that the invention may also be implemented in combination with other program modules.

Generally, program modules include routines, operations, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 is a high level diagram illustrating interaction between an account management system (AMS) server 107 and a terminal services (TS) environment 100 according to an illustrative embodiment of the present invention. The TS environment 100 includes a terminal server farm 110 with a TS server 110a, the AMS server 107 with AMS backup server 107', a user profile file storage server 112 housing roaming profiles 114, and web servers 104. The web severs 104 provide web pages 117 to a front end 105 where users 102 interface with the web pages 117 over a network via their computing devices and a port 108. The web pages 117 allow the users 102 to access the terminal server farm 110 via a front-end network 120. The web pages 117 are active server pages (ASP) such as '.aspx', a Microsoft ASP.NET file from Microsoft Corporation of Redmond, Wash. The web pages 117 automatically retrieve available TS accounts of the appropriate language provisioned for the users 102 and use those provisioned TS accounts to access the terminal server farm 110 where the hosted application 111 resides. The roaming profiles 114 for the users 102 that use the TS server farm 110 and the AMS 107 are stored on the file server 112 accessed via a back-end network 122. The roaming profiles 114 contain registry settings, application data, and the user's documents among other things. The roaming profiles 114 may also contain whatever standard profiles contain, with the addition of some sample documents. Additional details regarding creating available or 'free' TS accounts and provisioning TS accounts for use will be described below with respect to FIGS. 5-7.

Figure 2:
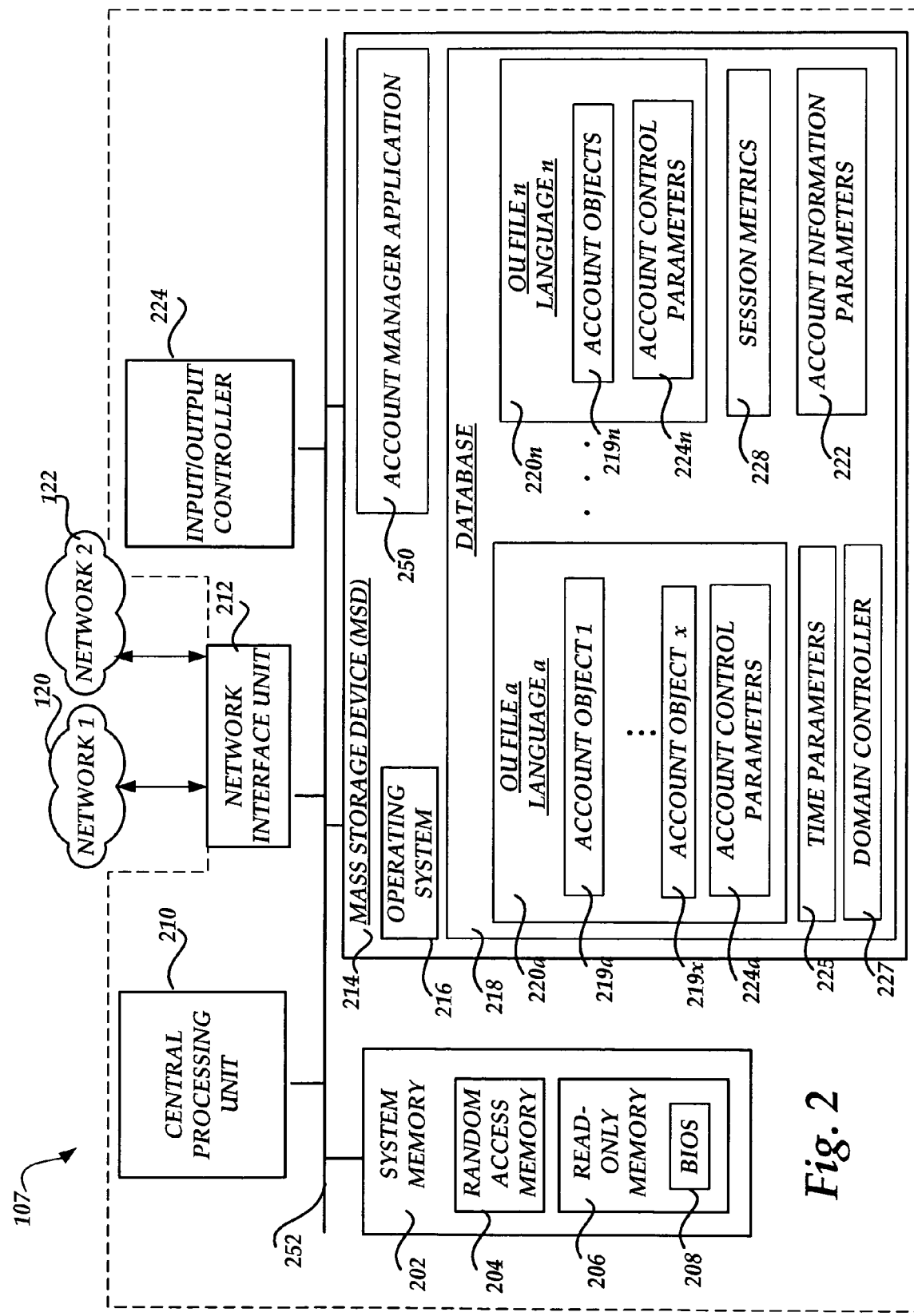
FIG. 2 illustrates a computing system architecture for an account management system server according to an illustrative embodiment of the present invention.

Referring now to FIG. 2, a computing system architecture for the AMS server 107 according to an illustrative embodiment of the present invention will be described. The AMS server 107 is a computing system, such as an SQL server, that includes a database 218, for example an SQL database, where TS accounts and associated data are stored, a central processing unit (CPU) 210, a system memory 202, and a system bus 252 that couples the system memory 202 to the processing unit 210. The system memory 202 includes read-only memory (ROM) 206 and random access memory (RAM) 204. A basic input/output system 208 (BIOS), containing the basic routines that help to transfer information between elements within the RMS 160, such as during start-up, is stored in ROM 206. The AMS server 107 further includes a mass storage device (MSD) 214 for storing an operating system 216, an account manager application 250, and a domain controller 227 for describing allowed values for database parameters.

The MSD 214 may also store the database 218 that stores organizational unit (OU) files 220a-220n. Where n is the number of individual organizational units existing for each language and/or variation between hosted applications that the AMS will support. Active directory account objects are created in each of the organizational units. This design allows rapid account creation for a given language and/or variation as needed. Each organizational unit file 220 stores an account object for each TS account, such as account objects 219a-219x for OU file 220a. The OU files 220 also store account control parameters 224a-224n for specifying characteristics of the account such as the language the TS accounts support, how many TS accounts are to be created, and what is the minimum number of TS accounts permitted before more are created. Additional details regarding account control parameters will be described below with respect to FIGS. 4 and 6.

The database 218 also stores time parameters 225 for specifying time limits and/or frequencies for managing the accounts such as frequencies for polling the OU files 220 to check available TS account quantities, duration limits for TS sessions and TS accounts, and TS session usage before a warning notice. The database 218 also stores session metrics 228 and account information parameters. Additional details regarding the time parameters 225, session metrics 228, and account information parameters will be described below with respect to FIGS. 4, 7, 8a-8b, and 9.

The MSD 214 is connected to the CPU 210 through a mass storage controller (not shown) connected to the system bus 252. The MSD 214 and its associated computer-readable media, provide non-volatile storage for the AMS server 107. Although the description of computer-readable media contained herein refers to a mass storage device, such as a hard disk or CD-ROM drive, it should be appreciated by those skilled in the art that computer-readable media can be any available media that can be accessed by the CPU 210.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the CPU 210.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

According to various embodiments of the invention, the AMS server 107 operates in a networked environment as shown in FIG. 1 using logical connections to remote computers through the networks 120 and 122, such as the Internet, an Intranet, or a local area network (LAN). The AMS 107 may connect to the network 120 through a network interface unit 212 connected to the system bus 252. It should be appreciated that the network interface unit 212 may also be utilized to connect to other types of networks and remote computer systems. The AMS 107 may also include an input/output controller 224 for receiving and processing input from a number of devices, including a keyboard or mouse (not shown). Similarly, the input/output controller 224 may provide output to a display screen, a printer, or other type of output device. Additional details regarding the operation of the AMS server 107 will be described below with respect to FIGS. 3-9.

Figure 3:
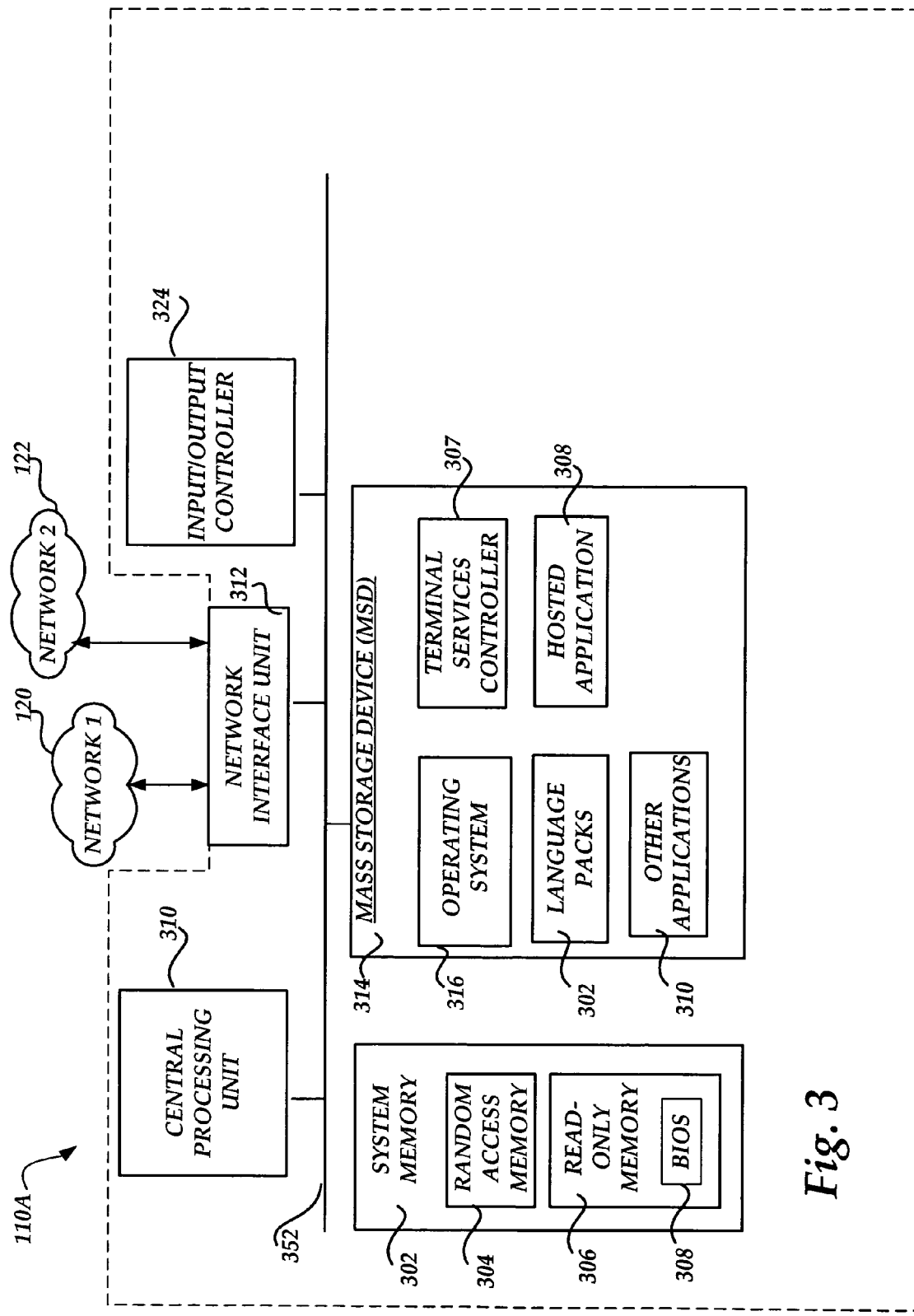
FIG. 3 illustrates a computing system architecture for a TS server in a server farm in communication with the AMS server of FIG. 2 according to an illustrative embodiment of the present invention.

FIG. 3 illustrates a computing system architecture for the TS server 110a in the server farm 110 in communication with the AMS server 107 of FIG. 2 according to an illustrative embodiment of the present invention. The TS server 110a is a TS computing system containing components similar to those described above with respect to FIG. 2. The TS server 110a also includes an MSD 314 storing an operating system 316, a terminal services controller 307, the hosted application 111, and language packs 302 for applying the appropriate language when rendering the hosted application 111 to a user.

Individual OUs are created per supported language in order to allow granular control over the group policies applied to each localized version of the hosted application 111. This is useful in many cases and allows customized experiences to match the needs of each language that the hosted application 111 is offered in, whilst still leveraging a set of TS servers 110 to serve all languages. One specific example of this functionality is that login scripts will be created for each OU in order to apply the language packs 302. This will result in language packs of the appropriate language being applied to user TS accounts in each OU. The OU design detailed above, combined with the logon script feature means that a given TS farm can be leveraged to service users of all supported languages. With this design, free or available TS accounts can be allocated to whichever set of users need them most thereby optimizing hardware usage. The language packs 111 for the languages supported are installed on each TS server in the TS server farm 110.

As described briefly above, the TS server 110a stores the TS controller 307. It should be appreciated that the TS controller 307 is stored on each TS server in the TS server farm 110. The TS controller 307 is an online TS hosted application that can block functionality of the hosted application 111, track session metrics, limit TS session length, provide custom messages at warning times, and update the accounts database to flag an account as being ready for purging. This functionality may be provided by setting a group policy to start the TS controller 307 with every TS session. The TS controller is operative to manage different allotted time limits for different hosted applications on the same server. Group policy would allow different time limits per server, but not per trial or use for a given hosted application. Thus, different marketing trials can each specify different time limits using the TS controller. The TS Controller is designed to run hidden and not accept any user input. Additional details regarding the TS controller 307 will be described below with respect to FIGS. 8a-8b.

Figure 4:
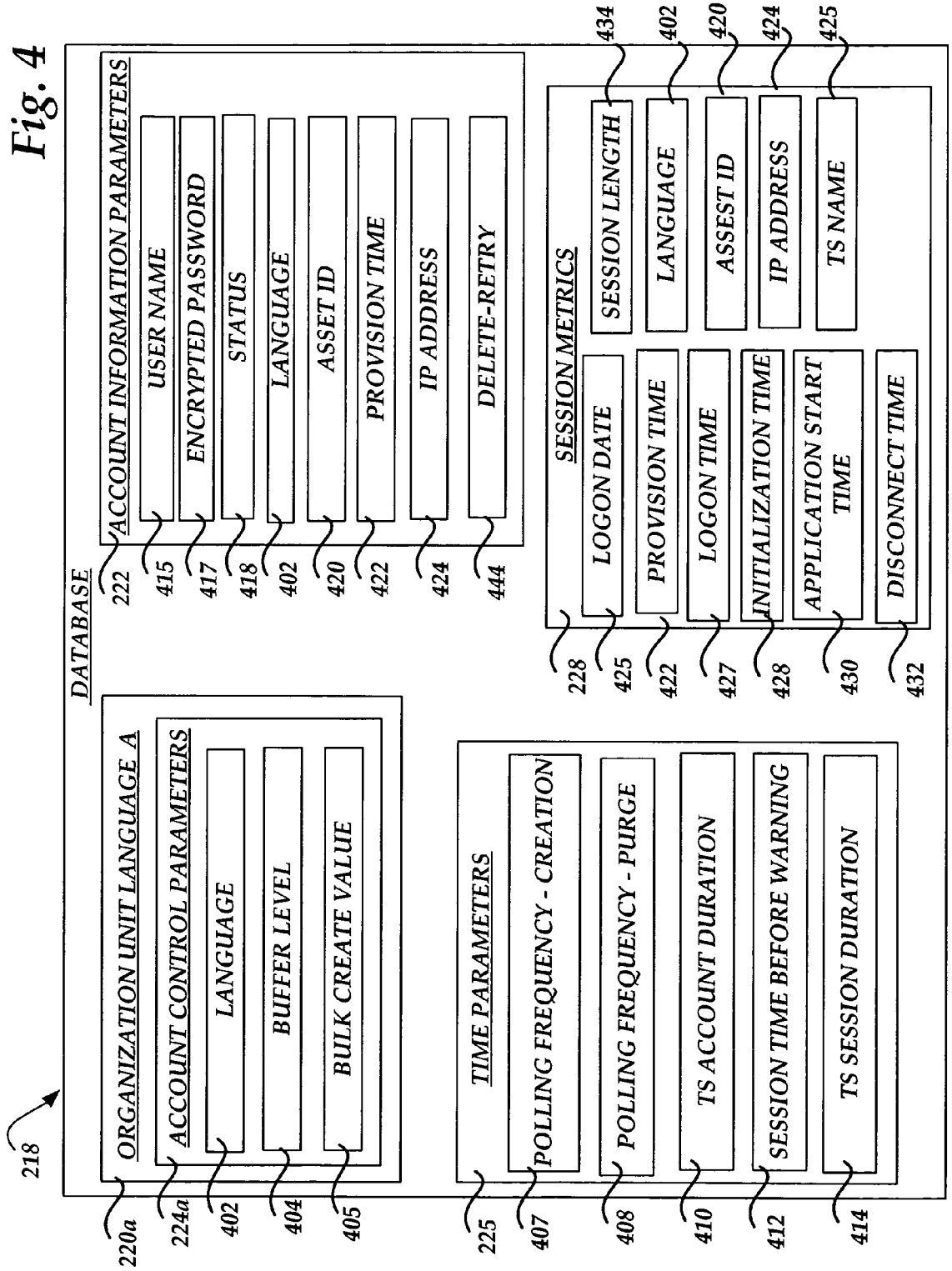
FIG. 4 is a block diagram illustrating parameter fields of the AMS database according to an illustrative embodiment of the present invention.

Turning now to FIG. 4 a block diagram illustrating parameter fields of the AMS database 218 according to an illustrative embodiment of the present invention will be described. As briefly described above with respect to FIG. 2, the database 218 stores the account control parameters 224 for each OU, the time parameters 225, the account information parameters 222, and the session metrics 228. The following is a detailed description of the parameter fields for storing TS account data elements.

TS Account Control Parameters

The account control parameters, for example 220a, include a language parameter 402 that represents the language in which the hosted application 111 will be when a user is logged into a TS session with credentials provided by the AMS and described by the language parameter in a given field of a record in the database 218. A buffer level 404, representing the minimum number of TS accounts with available status that can exist in an OU prior to the AMS creating more TS accounts, is also included. Still further, the account control parameters also include a bulk create parameter 405. The bulk created parameter 405 represents the number of TS accounts to be created for a given OU and/or language when the AMS detects that more TS accounts need to be created.

Time Parameters

The time parameters 225 include a polling frequency 407 representing a time value between periodic queries of TS accounts to detect whether more TS accounts should be created, a polling frequency 408 representing a time value between periodic queries of TS accounts for detecting whether any TS accounts should be purged or deleted, and a TS account duration 410 representing a time span between provisioning a TS account and deletion of the TS account provisioned. The time parameters 225 further include a warning time 412 representing a time span between provisioning a TS account and rendering a warning to a user during a TS session and a TS session duration 414 representing a time limit at which a TS session is disconnected.

Account Information Parameters

The account information parameters 222 make up records or tables associated with each account. The account information parameters include a status 418 associated with a created TS account representing whether the TS account is available, in use, or designated for cleanup. 'Free' status indicates that the TS account is free or available to be provisioned for use, 'in use' status indicates the TS account has been provisioned, and 'cleanup' status indicates the TS account is tagged for deletion. The account information parameters 222 also include a username 415 produced and associated with a provisioned TS account in response to the demand for a TS account and a password 417 generated, encrypted, and associated with the provisioned TS account in response to the demand for a TS account. The language parameter 402 described above may also be included as an account information parameter. A "delete-retry" field 444 exists and is used to track the number of deletion attempts that the AMS 107 has made for every account.

Session Metrics

The session metrics 228 may be collected and saved to the database 218 by the TS controller 307. The session metrics 228 include a logon date 425 representing the date when the user requested access to the TS session, the provision time 422 described above, and a logon time 427 representing the time when the user is able to use the hosted application because it has loaded and the TS session has started. The session metrics may also include an application start time 430 representing the time at which the hosted application 111 is launched, an initialization time 428 representing the difference in time between the time the user requested access to the TS session and the time at which the hosted application is launched, and a disconnect time 432 representing the time a connection state of the TS session is detected to be disconnected.

Still further, the session metrics 228 may include the language 402 described above associated with the TS account located, a session length 434 representing the difference in time between the time the TS session is disconnected and the time when the TS session loaded and the user was able to use the hosted application, and an identifier 420 of the asset that the user used in their TS session. The assetID 420 is a unique ID of the asset that served as the entry point for the hosted evaluation. The entry point assets are hosted on the web pages 117. Finally, the session metrics 228 may include an IP address 424 from which the user accessed the TS session and a name of a terminal server 425 utilized for the TS session. The terminal server name 425 may be mapped from a server identifier in a Name-ID mapping table.

Figure 5:
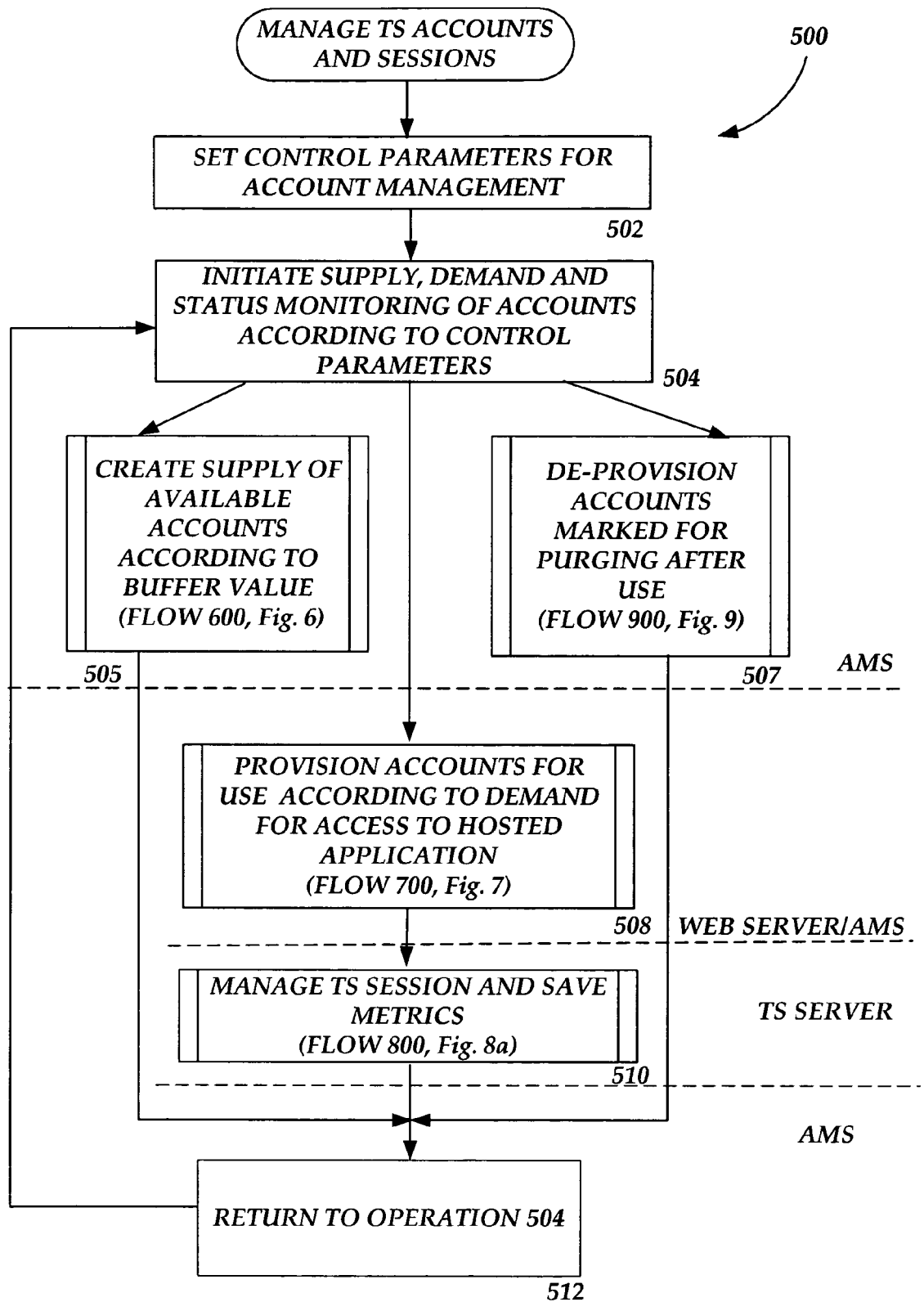
FIG. 5 illustrates an operational flow diagram for managing TS accounts and sessions for online utilization and/or evaluation of hosted applications according to an illustrative embodiment of the present invention.

Referring now to FIG. 2, FIG. 3, and FIG. 5, an operational flow diagram for managing TS accounts and sessions for online utilization and/or evaluation of hosted applications according to an illustrative embodiment of the present invention will be described. The operational flow 500 begins at operation 502 where the AMS sets the control parameters, for example 224a, for each OU and/or language for managing the TS accounts. Next, the operational flow 500 continues to operation 504 where the AMS 107 monitors a supply, a demand for, and a status of TS accounts. The operational flow 500 then continues to operations 505, 508, and 507 described below.

At operation 505, the AMS 107 creates TS accounts for an OU and/or language when the AMS 107 detects that a supply of available TS accounts has diminished below a minimum value or level for that OU and/or language. The operational flow 500 then continues to operation 512 where the operational flow is directed to return to operation 504 described above. The operational flow 500 is an operating system service that is continuously executing. At preset frequencies, certain operations are performed such as verifying or detecting that there are sufficient TS accounts for a given language. Additional details regarding operation 505 will be described below with respect to FIG. 6.

At operation 508, the AMS 107 provisions available TS accounts for use in accessing a TS session based upon detecting requests for access. Additional details regarding operation 508 will be described below with respect to FIG. 7. Next the operational flow 500 continues from operation 508 to operation 510 where the TS controller 307 manages the TS session and collects and saves the session metrics 228 to the AMS 107. The operational flow 500 then continues to operation 512 described above. Additional details regarding operation 510 will be described below with respect to FIGS. 8*a*-8*b*.

At operation 507, the AMS de-provisions each TS account identified for deletion. The operational flow 500 then continues to operation 512 described above. Additional details regarding operation 507 will be described below with respect to FIG. 9.

Figure 6:
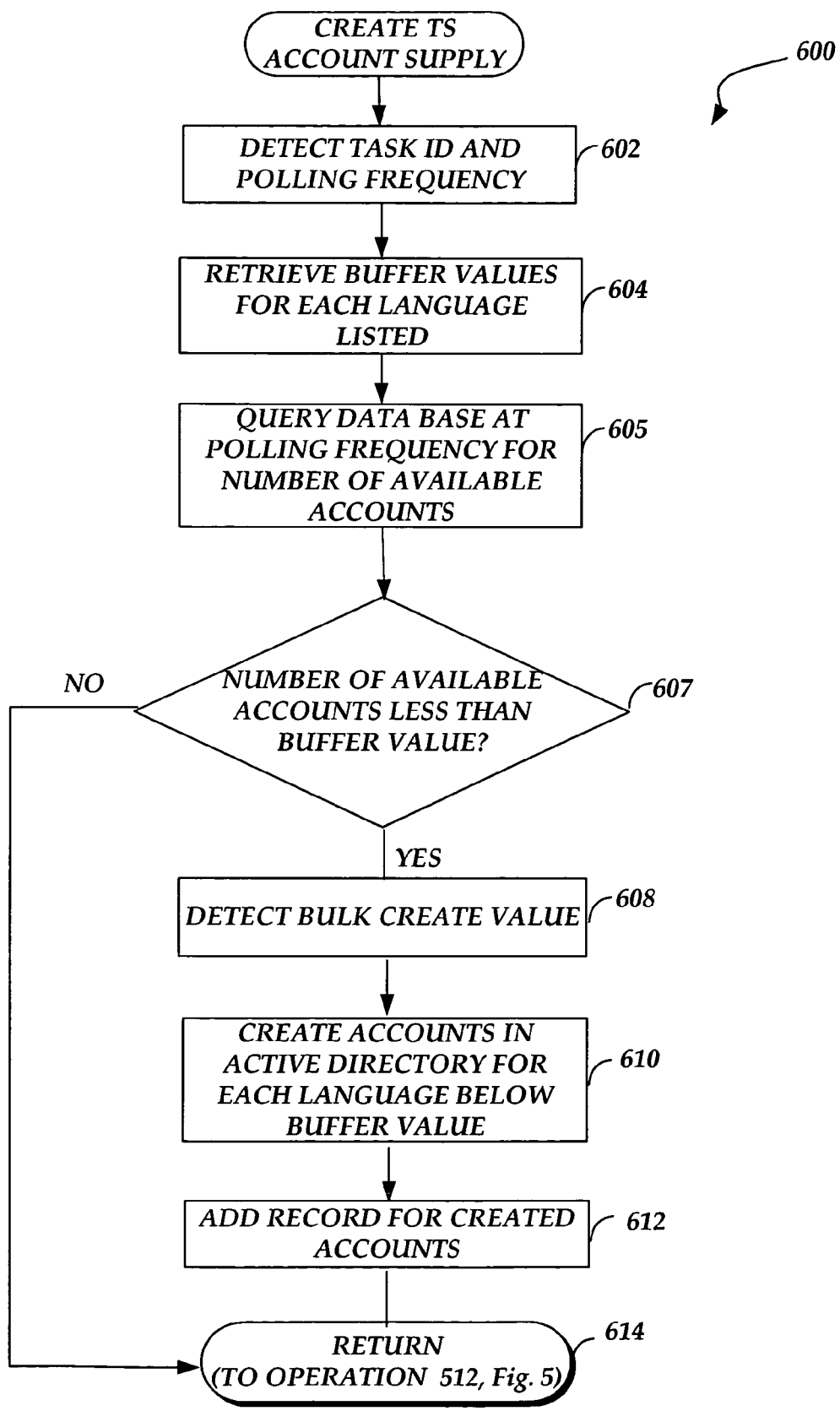
FIG. 6 illustrates an operational flow diagram for creating available TS accounts according to an illustrative embodiment of the present invention.

Turning now to FIGS. 2, 4, and 6, an operational flow diagram for creating available TS accounts according to an illustrative embodiment of the present invention will be described. Operational flow 600 begins at operation 602 where the AMS 107 detects a polling frequency 407 at which the database 218 is periodically queried to detect a quantity of available TS accounts. For example a polling frequency of zero would instruct the AMS not to query for creating a supply of accounts. This type of setting may be utilized for testing purposes.

Next, the operational flow 600 continues to operation 604 where the buffer level 404 is retrieved for each language and/or OU in the database 218. The buffer level is the minimum number of available accounts permitted before more TS accounts are created. The operational flow 600 then continues to operation 605 where the database 218 is queried for available TS accounts according to the polling frequency 407. Next, the operational flow 600 continues to detection operation 607 where, for each OU, a determination is made as to whether the number of available TS accounts is less than the buffer level 404. If the number of TS accounts having an available status is equal to or greater than the buffer level 404 for that OU, the operational flow continues to return operation 614 where control is passed to operation 512 described above.

When the AMS 107 detects a number of TS accounts below the buffer level 404 for an OU, the operational flow 600 continues to operation 608 where the bulk create value 405 is detected. The bulk create value 405 is the number of TS accounts to be created when the buffer levels 404 are not met. The operational flow 600 then continues to operation 610 where the AMS 107 creates TS accounts according to the bulk create value 405 for the OU having available TS accounts below the buffer level 404. The AMS 107 then adds a record to the database 218 for each TS account created at operation 612. The operational flow 600 then continues to return operation 614 described above.

Figure 7:
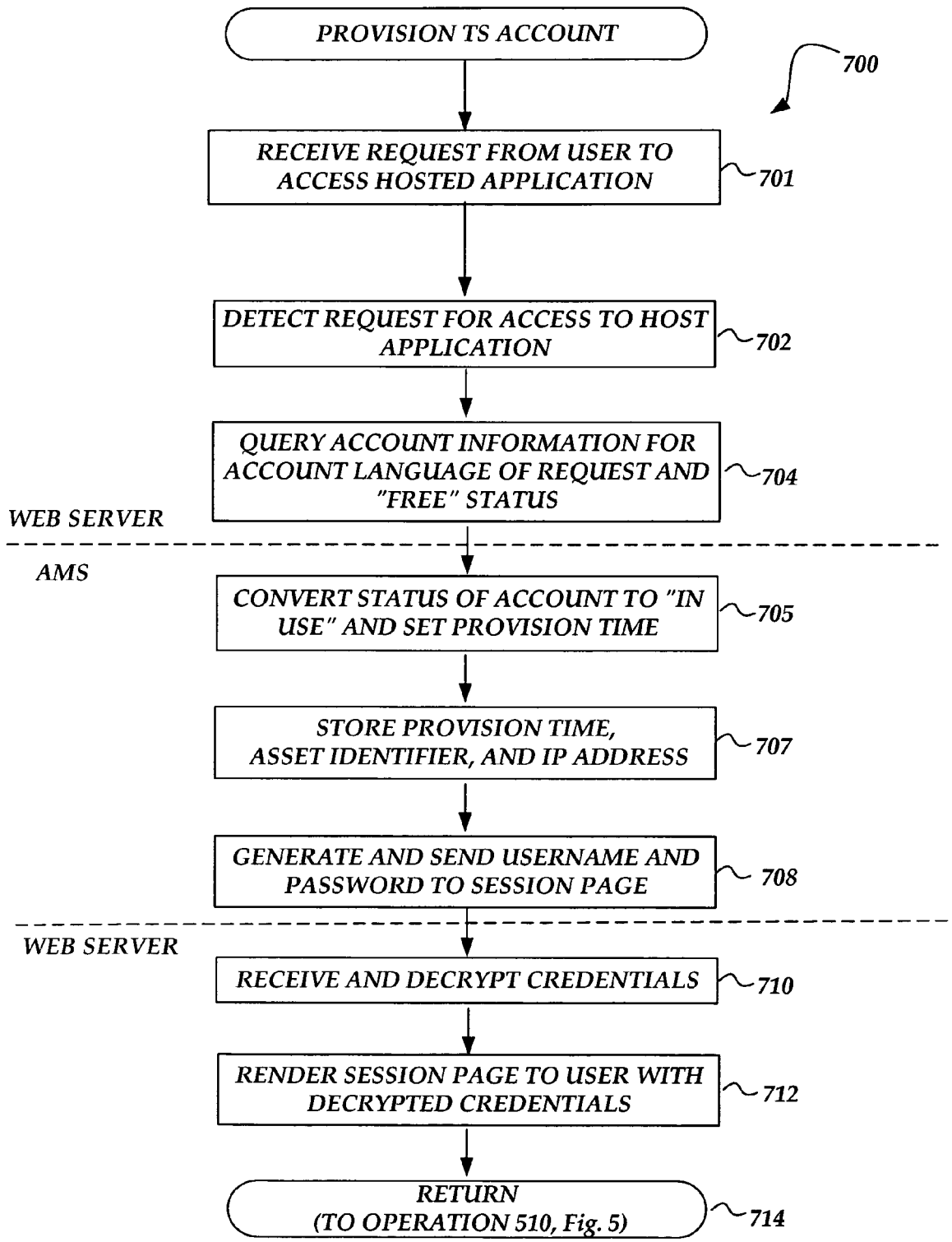
FIG. 7 illustrates an operational flow diagram for provisioning TS accounts for use according to an illustrative embodiment of the present invention.

Referring now to FIGS. 1, 4, and 7 an operational flow diagram for provisioning TS accounts for use according to an illustrative embodiment of the present invention will be described. The operational flow 700 is initiated at operation 701 where the web servers 104 receive a request from a user to access a TS session to utilize a hosted application. The operational flow 700 continues to operation 702 where the web page 117, such as session page.aspx, detects a user request to start a TS session. The web page 117 is the page within which the TS session is displayed to the user.

Next, at operation 704, in response to detecting the request, the web page 117 queries the account information parameters 222 for a TS account having the account language 402 matching the language of the request and the status 418 having a 'free' or available status.

At operation 705, a SQL stored procedure that the web page 117 calls converts the status 418 of the account located to 'in use' sets the provision time 422 described above. The web page 117 then stores the provision time 422, the asset identifier 420, and the IP address 424 to which credentials will be returned at operation 707.

The operational flow 700 then continues from operation 707 to operation 708 where the web page 117 sends credentials, the username 415 and the password 417, to the IP address identified in the IP address 424 field. The password 417 may be encrypted in the database 218. At operation 710 the web servers 104 receive and decrypt the credentials. Then at operation 712, the web servers render the decrypted credentials via a session web page 117. So the web pages 117 decrypt the account and then launch the terminal services session and automatically inputs the credentials for that account into the terminal services authentication dialogue such that the whole experience requires no input from the user once the request is made. The operational flow 700 then continues to return operation 714 where control is passed to operation 510 described above with respect to FIG. 5.

Turning now to FIGS. 1, 3, 4, and 8*a*-8*b* an operational flow diagram for managing TS sessions and TS accounts according to an illustrative embodiment of the present invention will be described. The operational flow 800 begins at operation 802 where the TS controller 307 detects the username assigned to the user requesting access to the hosted application 111. The TS controller 307 also detects the login date and login time the user logged in to the TS session.

The flow 800 then continues to operation 804 where the TS controller queries the account information parameters 222 to match the username with the username 415 associated with an in use TS account. The TS controller 307 also identifies the asset identifier 420 and the language 402 associated with the TS account located. The TS controller 307 and login scripts will setup a "Localized Experience" for the different customers. For a variety of languages, such as Japanese and German, users will be able to use their keyboard and localized language settings for date/time format, currency format, and other language specific features. This is accomplished through a login script setting specific reg-key values for the different languages, and through the TS controller 307 that switches the type of keyboard that is being used for the specific user.

Next, at operation 805, the TS controller queries session configuration information for a launch command to launch the hosted application 111. Then at operation 808, the TS controller detects time limit parameters such as the session warning time 412 and the TS session duration 414 associated with the TS account located.

Next the operational flow 800 continues from operation 808 to operation 810 where the appropriate dialogs, such as for warnings, are retrieved in the language associated with the TS account located. Then at operation 812, the TS controller 307 launches the hosted application 111 in the identified language by applying the appropriate language packs 302 (FIG. 3). The TS controller also detects the time the hosted application was launched or loaded at operation 814.

The operational flow 800 then continues from operation 814 to operation 817 where the TS controller restricts designated features and/or functionality of the hosted application 111. For example a minimize button and/or a restore function may be restricted and custom dialogs may be generated on the user's attempts to use such features and/or functions.

Figure 8A:
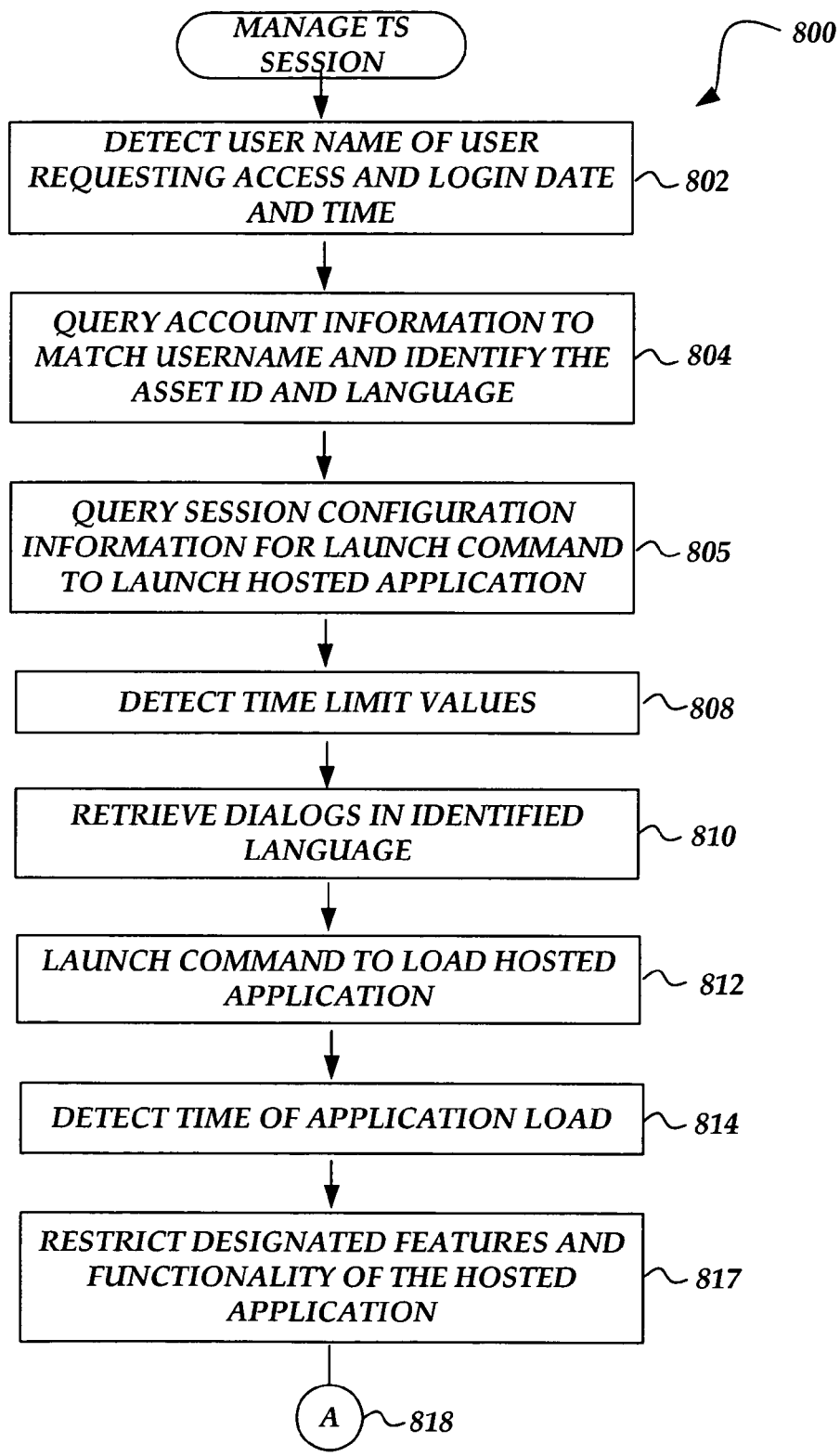
FIGS. 8A-8B illustrate an operational flow diagram for managing TS sessions and TS accounts according to an illustrative embodiment of the present invention.
Figure 8B:
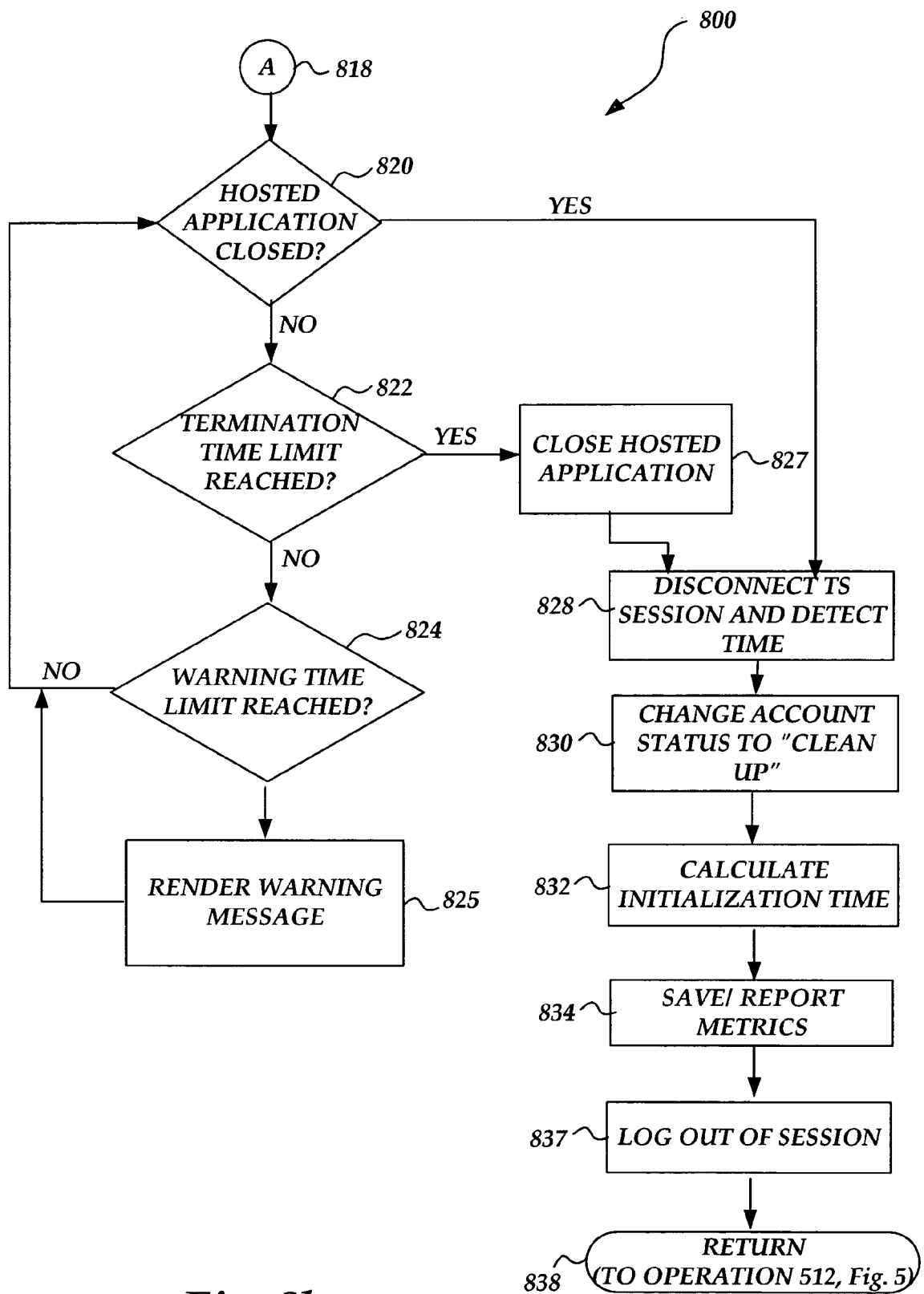

Turning to FIG. 8b, the operational flow continues from operation 817 to detect operation 820 where a determination is made as to whether the hosted application 111 has been closed. If the hosted application has been closed the operational flow 800 continues to operation 828 described below. If the hosted application is still open, the operational flow 800 continues to detect operation 822.

At detect operation 822, a determination is made as to whether the session duration 414 time has been reached. If the session duration 414 time has been reached, the operational flow 800 continues to operation 827 where the hosted application 111 is closed. Then the operational flow continues to operation 828 described below. If at operation 822, a determination is made that the TS session duration has not been reached, the operational flow 800 continues to detect operation 824.

At detect operation 824, a determination is made as to whether the warning time 412 has been reached. If the warning time has been reached, operation 825 renders a warning message to the user and then control passes to detect operation 820 described above. If the warning time has not been reached, the operational flow returns from detect operation 824 to detect operation 820 described above.

At operation 828 the TS session is disconnected and the time of the disconnection is detected for session metrics. The operational flow 800 then continues to operation 830 where the status 418 of the TS account in use is changed from in use to cleanup. Next, at operation 832 the initialization time 428 is calculated. The initialization time represents the difference in time between the time the user requested access to the TS session and the time at which the hosted application 111 is launched.

Next, at operation 834 the session metrics 228 are saved to the database 218 of the AMS 107. Then the TS controller 307 logs out of the TS session at operation 837. It should be appreciated that operation 834 may also report session metrics in the form of generated reports. The operational flow 800 then continues to return operation 838 where control passes to operation 512 described above.

Figure 9:
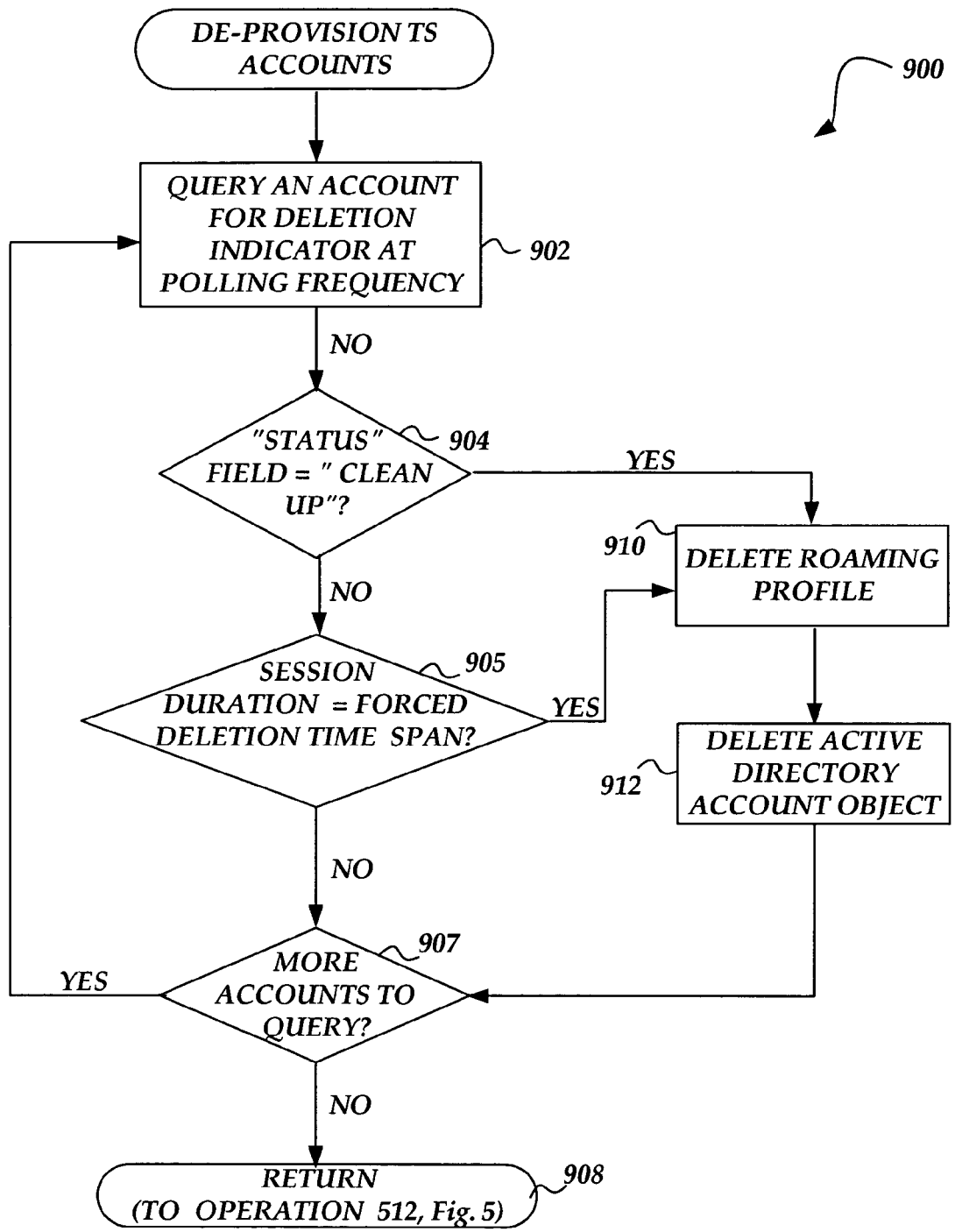
FIG. 9 illustrates an operational flow diagram for de-provisioning provisioned TS accounts according to an illustrative embodiment of the present invention.

Referring now to FIGS. 1, 4, and 9 an operational flow diagram for de-provisioning provisioned TS accounts according to an illustrative embodiment of the present invention will be described. The operational flow 900 begins at operation 902 where the AMS 107 queries a TS account for a deletion indication. The TS accounts are queried for deletion at the polling frequency 408 described above. Next at detect operation 904, a determination is made as to whether the status parameter 418 is marked or set to cleanup. If the status parameter 418 is set to cleanup, the operational flow 900 continues to operation 910.

At operation 910, the AMS 107 deletes the roaming profile 114 associated with the TS account having cleanup status from the profile storage server 112. Then at operation 912, the AMS 107 deletes the active directory TS account object representing the TS account from the database 218. It should be appreciated that if for some reason the account cannot be deleted the AMS 107 system will re-try deleting the account again for up to a preset number of retries, for example five (5) retries. As briefly summarized above, the AMS 107 will also disable an account after a user logs in so that the user can not log in again using that account information at a later date. The AMS will first disable the account when the user logs in then after the user logs out it will delete the account information. It does this by monitoring the database to see when an account is in use. The operational flow 900 then continues to detect operation 907 where a determination of whether there are more TS accounts to query.

If at operation 907, there are more TS accounts to query, the operational flow 900 returns to operation 902 described above. If there are no more TS accounts to query to operational flow 900 continues to return operation 908 where control is passed to operation 512 described above.

If at detect operation 904, the status 418 is not set to cleanup, the operational flow 900 continues to detect operation 905. At detect operation 905, a determination is made as to whether the TS session duration 414 has been reached for forced deletion. If the TS session duration 414 has been reached by the TS session, the operational flow continues to operation 910 described above. If the TS session duration 414 has not been reached, the operational flow 900 continues to detect operation 907 described above.

Thus, the present invention is presently embodied as methods, systems, computer program products or computer readable mediums encoding computer programs for managing terminal services (TS) accounts and/or sessions for online utilization of a hosted application.

As various changes may be made in the above system elements, software modules and methods without departing from the scope of the invention, it is intended that all matter contained in the above description as shown in the accompanying drawings shall be interpreted as illustrative and not in a limiting sense. Since many embodiments of the invention can be made without departing from the spirit and scope of the invention, the invention resides in the claims hereinafter appended.

We claim:

1. A method for managing terminal services (TS) accounts for online utilization of a hosted application, the method comprising:
   monitoring at least one of a supply of available TS accounts, a demand for TS accounts, and a status of each TS account;
   creating one or more TS accounts in response to detecting that the supply of available TS accounts is below a buffer level, wherein the buffer level comprises a minimum number of TS accounts having an available status, the number of TS accounts having an available status comprising at least one TS account; and
   provisioning a TS account for use in accessing a TS session that provides online use of the hosted application, wherein provisioning the TS account comprises:
      receiving a request to access to the hosted application;
      querying the supply of available TS accounts for TS accounts associated with a language that matches a language of the request;
      converting a status of one of the TS accounts associated with the language from a status of available to a status of in use;
      identifying an IP address to which the TS account having the status converted will be provisioned;
      providing and storing credentials on behalf of a user making the request;
      associating the credentials with a unique profile for the user;
      sending the credentials to the IP address; and
      identifying and storing a time when the credentials are sent to the IP address wherein each provisioned TS account is associated with a unique profile, and wherein users have their own profiles instantly created without the users needing to sign up for a TS account and without waiting for authentication;
   wherein the supply of available TS accounts is replenished whenever the supply of available TS accounts is below the buffer level to ensure that TS accounts are available for a plurality of users utilizing the hosted application via online TS sessions.

2. The method of claim 1, further comprising receiving and storing TS session metrics.

3. The method of claim 1, further comprising de-provisioning the TS account from use when the TS session is closed.

4. The method of claim 1, further comprising receiving and storing at least one of account control parameters, time parameters, and account information parameters for managing the TS accounts wherein the control parameters include at least one of the following:
   a language associated with each TS account created;
   the buffer level; and
   a bulk-create value comprising a number of TS accounts to be created when the supply of available TS accounts is below the buffer level;
   wherein the time parameters include at least one of the following:
      a first polling frequency comprising a time value between periodic queries of TS accounts for creating accounts;
      a second polling frequency comprising a time value between periodic queries of TS accounts for purging accounts;
      a TS account duration comprising a time span between provisioning a TS account and deletion of the TS account;
      a warning time comprising a time span between provisioning a TS account and rendering a warning to a user during a TS session; and
      a TS session duration comprising a time limit at which a TS session is disconnected; and
   wherein the account information parameters include at least one of the following:
      a status associated with each TS account created comprising one of available, in use, wherein in use status indicates the TS account has been provisioned, and cleanup, wherein cleanup status indicates the account is tagged for deletion;
      a username produced and associated with a provisioned TS account in response to the demand for a TS account;
      a "delete-retry" field associated with the TS account and used to track the number of deletion attempts made on the TS account; and
      a password generated, encrypted, and associated with the provisioned TS account in response to the demand for a TS account.

5. The method of claim 4, wherein creating the TS accounts comprises for each language in which the hosted application is available, creating TS accounts associated with a language when a supply of available TS accounts for that language is below the buffer level.

6. The method of claim 5, wherein each language is associated with a different organizational unit and wherein different control parameters and time parameters are received and stored for each organizational unit.

7. The method of claim 5, wherein creating the TS accounts further comprises:
   detecting the first polling frequency; and for each language in which the hosted application is available:
   retrieving the buffer level associated with the language;
   querying the TS accounts associated with the language at the first polling frequency;
   determining whether a supply of TS accounts having available status and associated with the language is below the buffer level associated with the language;
   in response to the supply of TS accounts associated with the language and having available status being below the buffer level associated with the language, creating TS accounts according to the bulk-create value associated with the language; and
   storing account information associated with the TS accounts created.

8. The method of claim 3, wherein de-provisioning the TS account from use comprises:
   querying the TS account information for TS accounts having a cleanup status;
   in response to detecting a TS account having the cleanup status, deleting a roaming profile of the TS account and deleting the TS account;
   in response to detecting a TS account having an in use status, determining whether a duration of the TS session for the TS account having the in use status has reached a deletion time span; and
   in response to determining that the duration of the TS session has reached the deletion time span, deleting a roaming profile of the TS account having the in use status and deleting the TS account having the in use status.

9. A computer program product comprising a computer usable storage medium having control logic stored therein for causing a computer to manage terminal services (TS) accounts for online utilization of a hosted application, the control logic comprising computer readable program code means for causing the computer to:
   monitor at least one of a supply of available TS accounts, a demand for TS accounts, and a status of each TS account; and
   create one or more TS accounts in response to detecting that the supply of available TS accounts is below a buffer level wherein the buffer level comprises a minimum number of TS accounts having an available status, the number of TS accounts having an available status comprising at least one TS account, and wherein the supply of available TS accounts is replenished whenever the supply of available TS accounts is below the buffer level.

10. The computer program product of claim 9, wherein the control logic further comprises computer readable program code means for causing the computer to provision a TS account for use in accessing a TS session that provides online use of the hosted application wherein each provisioned TS account is associated with a unique profile.

11. The computer program product of claim 10, wherein the control logic further comprises computer readable program code means for causing the computer to:
   de-provision the TS account from use when the TS session is closed; and receive and store TS session metrics.

12. The computer program product of claim 9, wherein the computer readable program code means for causing the computer to create the TS accounts comprises computer readable program code means for causing the computer to, for each language in which the hosted application is available, create TS accounts associated with a language when a supply of available TS accounts for that language is below the buffer level.

13. A system for managing terminal services (TS) accounts for online utilization of a hosted application, the system comprising:

a first computer operative to:
monitor at least one of a supply of available TS accounts, a demand for TS accounts, and a status of each TS account;
create one or more TS accounts in response to detecting that the supply of available TS accounts is below a buffer level wherein the buffer level comprises a minimum number of TS accounts having an available status, the number of TS accounts having an available status comprising at least one TS account; and
provision a TS account for use in accessing a TS session that provides online use of the hosted application wherein each provisioned TS account is associated with a unique profile;
wherein the supply of available TS accounts is replenished whenever the supply of available TS accounts is below the buffer level, thereby ensuring TS accounts are available for a plurality of users utilizing the hosted application via online TS sessions.

14. The system of claim 13, wherein the first computer is further operative to receive and store TS session metrics and de-provision the TS account from use when the TS session is closed.

15. The system of claim 13, wherein the first computer is further operative to receive and store at least one of account control parameters, time parameters, and account information parameters for managing the TS accounts wherein the control parameters include at least one of the following:
a language associated with each TS account created;
the buffer level; and
a bulk-create value comprising a number of TS accounts to be created when the supply of available TS accounts is below the buffer level;
wherein the time parameters include at least one of the following:
a first polling frequency comprising a time value between periodic queries of TS accounts for creating accounts;
a second polling frequency comprising a time value between periodic queries of TS accounts for purging accounts;
a TS account duration comprising a time span between provisioning a TS account and deletion of the TS account;
a warning time comprising a time span between provisioning a TS account and rendering a warning to a user during a TS session; and
a TS session duration comprising a time limit at which a TS session is disconnected; and
wherein the account information parameters include at least one of the following:
a status associated with each TS account created comprising one of available, in use wherein in use status indicates the TS account has been provisioned, and cleanup wherein cleanup status indicates the account is tagged for deletion;
a username produced and associated with a provisioned TS account in response to the demand for a TS account; and
a password generated, encrypted, and associated with the provisioned TS account in response to the demand for a TS account.

16. The system of claim 15, wherein for each language in which the hosted application is available, the first computer is operative to create TS accounts associated with a language when a supply of available TS accounts for that language is below the buffer level.

17. The system of claim 15, wherein the first computer when creating the TS accounts is operative to:
detect the first polling frequency; and
for each language in which the hosted application is available:
retrieve the buffer level associated with the language;
query the TS accounts associated with the language at the first polling frequency;
determine whether a supply of TS accounts having available status and associated with the language is below the buffer level associated with the language;
in response to the supply of TS accounts associated with the language and having available status being below the buffer level associated with the language, create TS accounts according to the bulk-create value associated with the language; and
store account information associated with the TS accounts created.

18. The system of claim 13, wherein the first computer provisions the TS account in response to the demand for a TS account wherein the demand comprises a request to access to the hosted application.

19. The system of claim 18, wherein the first computer when provisioning the TS account is further operative to:
query the supply of available TS accounts for TS accounts associated with a language that matches a language of the request;
convert a status of one of the TS accounts associated with the language from available to in use;
identify an IP address to which the TS account having the status converted will be provisioned;
provide and store credentials associated with a unique profile of a user making the request;
send the credentials to the IP address; and
identify and store a time when the credentials are sent to the IP address.

20. The system of claim 19, further comprising a second computer, wherein the second computer is operative to:
receive the request to access the hosted application via a web page;
decrypt the credentials sent to the IP address; and
render the credentials to a user via the web page whereby TS accounts are provisioned and TS sessions provides access to the hosted application without a user entering credentials.

21. The system of claim 20, further comprising a third computer wherein the third computer is operative to receive and store the unique profile of a user.

22. A method for managing terminal services (TS) sessions and TS accounts for online evaluation of a hosted application, the method comprising:
detecting a username assigned to a user requesting access to a TS session to evaluate the hosted application;
locating a TS account in use that is associated with the username assigned;
identifying a language associated with the TS account located wherein the language comprises the language in which the user requested access; and
launching the hosted application in the language associated with TS account located.

23. The method of claim 20, further comprising restricting designated features and designated functionality of the hosted application.

24. The method of claim 20, further comprising detecting at least one of a date and a time when the user requested access to the TS session.

25. The method of claim 20, further comprising identifying an asset that serves as an entry point for the hosted application and launching at least one of help content and the hosted application based on the asset identified.

26. The method of claim 20, further comprising detecting time parameters associated with the TS account located wherein the time parameters include at least one of the following:
 a TS account duration comprising a time span between provisioning the TS account and deletion of the TS account;
 a warning time comprising a time span between provisioning a TS account and rendering a warning to a user during a TS session; and
 a TS session duration comprising a time limit at which a TS session is disconnected.

27. The method of claim 21, further comprising retrieving dialog information based on the language associated with the TS account located and rendering the dialog information to the user in response to the user attempting to use at least one of the designated features restricted and the designated functionality restricted.

28. The method of claim 22, further comprising detecting a time at which the hosted application is launched.

29. The method of claim 26, further comprising:
 determining whether the hosted application has been closed;
 in response to the hosted application being closed, disconnecting the TS session; and
 changing a status of the TS account from in use to cleanup.

30. The method of claim 27, further comprising in response to the hosted application being closed:
 detecting a time the TS session is disconnected;
 calculating a difference in time between the time the user requested access to the TS session and the time at which the hosted application is launched;
 saving session metrics; and
 logging out of the TS session.

31. The method of claim 24, further comprising:
 determining whether the TS session duration has been reached; and
 in response to determining that the TS duration has been reached, closing the hosted application.

32. The method of claim 24, further comprising:
 determining whether the warning time has been reached; and
 in response to determining that the warning time has been reached, rendering a warning message.

33. The method of claim 28, wherein saving the session metrics comprises saving at least one of the following:
 the date when the user requested access to the TS session;
 the time when the user requested access to the TS session;
 a time at which the TS account was provisioned;
 the time at which the hosted application is launched;
 the difference in time between the time the user requested access to the TS session and the time at which the hosted application is launched;
 a time the TS session is disconnected;
 the difference in time between the time the TS session is disconnected and the time when the user requested access to the TS session;
 the language associated with the TS account located;
 an identifier of the asset where the TS account is located;
 an IP address from which the user accessed the TS session; and
 a name of a terminal server utilized for the TS session.

34. A computer program product comprising a computer usable storage medium having control logic stored therein for causing a computer to manage terminal services (TS) sessions and TS accounts for online evaluation of a hosted application, the control logic comprising computer readable program code means for causing the computer to:
 detect a username assigned to a user requesting access to a TS session to evaluate the hosted application;
 locate a TS account in use that is associated with the username assigned;
 identify a language associated with the TS account located wherein the language comprises the language in which the user requested access; and
 launch the hosted application in the language associated with TS account located.

35. The computer program product of claim 32, wherein the control logic further comprises computer readable program code means for causing the computer to restrict designated features and designated functionality of the hosted application.

36. The computer program product of claim 32, wherein the control logic further comprises computer readable program code means for causing the computer to detect at least one of a date and a time when the user requested access to the TS session.

37. The computer program product of claim 32, wherein the control logic further comprises computer readable program code means for causing the computer to identify an asset that serves as an entry point for the hosted application and launch at least one of help content and the hosted application based on the asset identified.

38. The computer program product of claim 32, wherein the control logic further comprises computer readable program code means for causing the computer to detect time parameters associated with the TS account located wherein the time parameters include at least one of the following:
 a TS account duration comprising a time span between provisioning the TS account and deletion of the TS account;
 a warning time comprising a time span between provisioning a TS account and rendering a warning to a user during a TS session; and
 a TS session duration comprising a time limit at which a TS session is disconnected.

39. The computer-readable storage medium program product of claim 33, wherein the control logic further comprises computer readable program code means for causing the computer to retrieve dialog information based on the language associated with the TS account located and render the dialog information to the user in response to the user attempting to use at least one of the designated features restricted and the designated functionality restricted.

40. The computer program product of claim 34, wherein the control logic further comprises computer readable program code means for causing the computer to:
 detect a time at which the hosted application is launched;
 detect whether the hosted application has been closed;
 in response to the hosted application being closed, disconnect the TS session; and
 change a status of the TS account from in use to cleanup.

41. The computer program product of claim 38, wherein the control logic further comprises computer readable program code means for causing the computer to in response to the hosted application being closed:

detect a time the TS session is disconnected;
calculate a difference in time between the time the user requested access to the TS session and the time at which the hosted application is launched;
save session metrics; and
log out of the TS session.

* * * * *